T 860,004

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 677

580,216

WIDE EXPOSURE LATITUDE PHOTOGRAPHIC ELEMENTS

James L. Graham, Kodak Park, Rochester, N.Y.

Filed Sept. 19, 1966. Published Mar. 18, 1969

Class 96—74

No Drawing. 20 Pages Specification

Extended latitude films are provided comprising a support which carries the following color-forming units, arranged inter se in the order given:

| No. | Color-Forming Unit |
|---|---|
| 1 | Red-sensitive, cyan-producing color-forming unit. |
| 2 | Green-sensitive, magenta-producing color-forming unit. |
| 3 | Blue-sensitive, yellow-producing color-forming unit. |
| 4 | Red-sensitive, cyan-producing color-forming unit. |
| 5 | Green-sensitive, magenta-producing color-forming unit. |
| 6 | Blue-sensitive, yellow-producing color-forming unit. |

A magenta filter is positioned between the two green-sensitive color-forming units and a cyan filter is positioned between the two red-sensitive color-forming units, so that the response of the two blue-sensitive, yellow-producing color-forming units is equal and matches the response of both the green-sensitive and both the red-sensitive color-forming units. Preferably, the cyan and magenta filter is positioned between units Nos. 3 and 4. Each color-forming unit can include fast and slow silver halide emulsion layers. No neutral density (or antihalation layer) is present between or in the several color-forming units. Exposed films can be processed by the negative color process described by Hanson et al., in the "Journal of the Society of Motion Picture and Television Engineers," vol. 61 (1953), pages 667–701.